April 27, 1954     H. E. TEMPLE     2,676,691
CONVEYER ESCAPEMENT MECHANISM
Original Filed Oct. 2, 1950
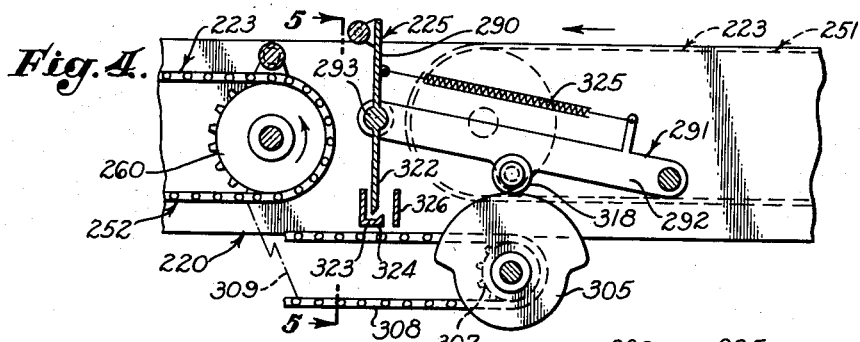
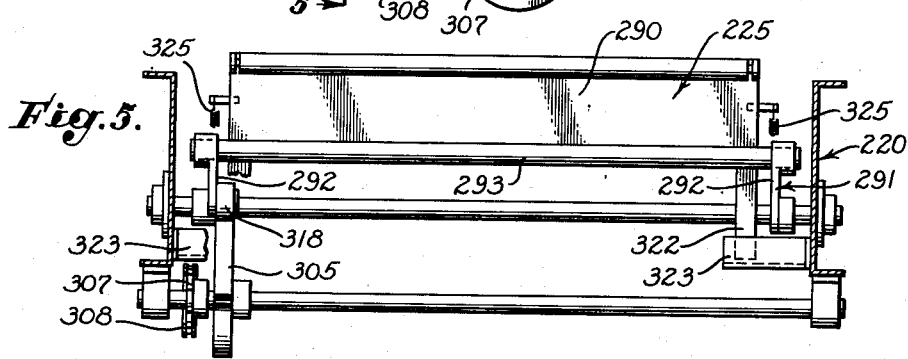
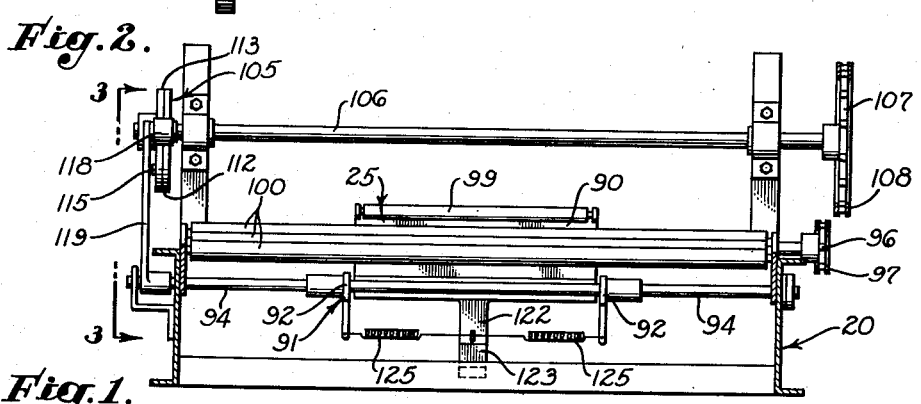
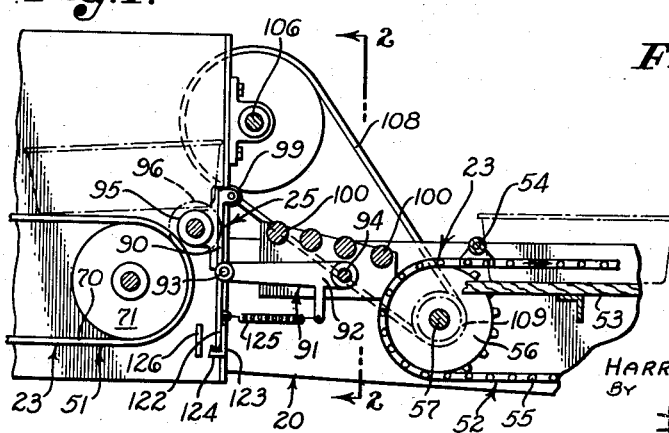
INVENTOR.
HIRAM E. TEMPLE
BY HIS ATTORNEYS.
HARRIS, KIECH, FOSTER & HARRIS Patented Apr. 27, 1954

2,676,691

UNITED STATES PATENT OFFICE 2,676,691

CONVEYER ESCAPEMENT MECHANISM

Hiram E. Temple, San Gabriel, Calif., assignor to Read Standard Corporation, a corporation of Delaware Original application October 2, 1950, Serial No. 187,861. Divided and this application April 24, 1952, Serial No. 284,117

9 Claims. (Cl. 198—23)

The present invention relates in general to conveyor systems and, more particularly, to a conveyor system having inlet and outlet sections and having escapement means for passing one article at a time from the inlet section to the outlet section thereof, this application being a division of my copending application Serial No. 187,861, filed October 2, 1950.

The present invention finds particular utility in the baking industry for handling bread pans, or, more particularly, pan straps or units each comprising several parallel bread pans suitably connected together, as by an encompassing strap, and will be considered in such connection herein as a matter of convenience. However, it will be understood that the invention is susceptible of other applications.

An important object of the invention is to provide an escapement means having gate means operating in timed relation with the conveyor system for releasing one pan strap at a time to the outlet section of the conveyor system so as to space successive pan straps apart on the outlet section thereof.

More particularly, an important object of the invention is to provide an escapement means which includes a gate movable from an extended position to a retracted position to permit the passage of a pan strap, or other article, from the inlet conveyor section to the outlet conveyor section, and which includes means for preventing retraction of the gate during a particular operating cycle of the escapement means unless a pan strap on the inlet conveyor section has been intercepted by the gate prior to initiation of an operating cycle. In other words, the escapement means does not permit the passage of a pan strap which is intercepted by the gate after the initiation of an operating cycle, the gate intercepting and restraining such a pan strap until the beginning of the next operating cycle. This insures proper positioning of the pan straps on the outlet conveyor section in a predetermined pattern, which is an important feature of the invention.

Another object is to provide an escapement means which includes a cam for alternately moving the gate into its extended and retracted positions, and which includes latch means for retaining the gate in its extended position whenever the inlet conveyor section fails to bring a pan strap into engagement with the gate prior to rotation of the cam into a position permitting movement of the gate into its retracted position. Thus, under such conditions, the latch means prevents retraction of the gate until the beginning of the next operating cycle of the cam even if a pan strap engages the gate when the cam is in a position to permit retraction thereof.

Another object is to provide a latch means which is controlled by pan straps on the inlet conveyor section and, more particularly, to provide a latch means which is rendered inoperative by engagement of a pan strap on the inlet conveyor section with the gate during that portion of the operating cycle in which the cam is in a position to maintain the gate in its extended position. In other words, a pan strap on the inlet conveyor section cannot render the latch means inoperative during the interval in which the cam is in a position to permit retraction of the gate, which is an important feature.

Still another object is to provide a gate which is adapted to be tilted into a position to render the latch means inoperative when the gate is engaged by a pan strap during the interval that the cam is in a position to maintain the gate in its extended position. If no pan strap engages the gate while it is maintained in its extended position by the cam, it does not tilt and the latch means remains operative to prevent retraction of the gate even when the cam rotates into a position to permit retraction thereof.

Still another object is to provide a latch means which includes a movable latch element actuable by, and preferably carried by, a gate and engageable with a stationary latch element, the movable latch element moving out of engagement with the stationary latch element upon tilting of the gate by an intercepted pan strap when the cam is in a position to hold the gate in its extended position.

The foregoing objects and advantages of the present invention, together with various other objects and advantages thereof which will become apparent, may be attained with the exemplary embodiments of the invention illustrated in the accompanying drawing and described in detail hereinafter. Referring to the drawing:

Fig. 1 is a longitudinal sectional view of a conveyor system incorporating the escapement means of the invention;

Fig. 2 is a sectional view taken along the arrowed line 2—2 of Fig. 1;

Fig. 3 is a fragmentary elevational view on a reduced scale taken along the arrowed line 3—3 of Fig. 2;

Fig. 4 is a longitudinal sectional view of a conveyor system incorporating another embodiment of the escapement means of the invention; and Fig. 5 is a sectional view taken as indicated by the arrowed line 5—5 of Fig. 4.

Referring first to Figs. 1 to 3 of the drawing, the conveyor system illustrated therein includes a frame 20 which carries a conveyor 23 and which carries an escapement means or gate means 25 for spacing pan straps or other articles apart on the conveyor. The conveyor 23 includes an inlet section 51 and includes an outlet section 52, the gate means 25 being disposed between the inlet and outlet sections of the conveyor. As best shown in Fig. 1, the outlet section 52 of the conveyor 23 includes a platform 53 along which the pan straps are adapted to slide, the outlet section further including one or more transverse sweeping bars 54 which extend across the platform 53 and which are carried at their ends by chains 55. The chains 55 are trained around sprockets 56 carried by a shaft 57 at one end of the outlet section and are driven in any suitable manner, not shown.

The inlet section 51 of the conveyor 23 may be of any desired construction and is illustrated as including a flexible conveying element 70 trained around a rotatable element 71. The inlet section 51 may be driven independently of the outlet section 52, or may be driven in timed relation therewith in any suitable manner, not shown.

The gate means 25 includes a gate 90 located between the inlet and outlet sections 51 and 52 of the conveyor 23 and movable between an extended position, best shown in Fig. 1, wherein it is adapted to intercept a pan strap delivered to the gate means by the inlet section 51, and a retracted position wherein it moves downwardly out of the path of a pan strap on the inlet section 51 to permit passage of such pan strap from the inlet section to the outlet section 52. The gate 90 is mounted for movement between its extended and retracted positions by means of an arm means 91 comprising a pair of arms 92 pivotally connected to the gate 90 at 93 and carried by a shaft 94 which is rotatably carried by the frame 20. Thus, the gate 90 may rotate between its extended and retracted positions about the axis of the shaft 94, it being apparent that, in the particular construction illustrated, the gate 90 is biased toward its retracted position by the action of gravity.

Adjacent the gate 90 on the same side thereof as the inlet section 51 is a roller 95, the roller 95 being driven by a sprocket 96, Fig. 2, having trained therearound a chain 97 which is driven in any suitable manner, not shown. As will be apparent, the roller 95 assists the inlet section 51 in moving a pan strap into engagement with the gate 90 to be intercepted thereby. The gate 90 carries an idling roller 99 on the same side thereof as the outlet section 52 of the conveyor 23, a pan strap intercepted by the gate being adapted to ride over the idling roller 99 onto idling rollers 100 when the gate is in its retracted position. The idling rollers 100 have their axes of rotation in a plane which slopes downwardly toward the outlet section 52 of the conveyor 23 so that a pan strap riding over the idling roller 99 on the gate rolls downwardly over the idling rollers 100 onto the outlet section 52.

The gate 90 is controlled by a cam 105 on a shaft 106 carried by the frame 20, the cam being driven by a sprocket 107 on the shaft 106. The sprocket 107 is driven from the shaft 57 of the outlet section 52 of the conveyor 23 through a chain 108 trained around the sprocket 107 and around a sprocket 109 on the shaft 57. Thus, the cam 105 is driven in timed relation with the conveyor section 52.

The cam 105 is provided with a peripheral cam surface which includes a long-radius extending zone 112 and a short-radius retracting zone 113, the zones 112 and 113 being connected by a rise and a fall to provide a continuous cam surface. As best shown in Figs. 2 and 3, the cam 105 is formed in two parts which are relatively rotatable about the axis of the camshaft 106, one of the parts of the cam 105 being provided with a slot 114 for a bolt 115 for clamping the two parts of the cam together in any desired angular relationship. Thus, the relative lengths of the extending and retracting zones 112 and 113 may be varied to vary the relative intervals during which the gate 90 is in its extended and retracted positions as will become apparent.

The cam controls the gate 90 through a cam follower 118 carried by an arm 119 which is in turn carried by the shaft 94 and which forms parts of the arm means 91. As will be apparent, whenever the cam follower 118 is in engagement with the extending zone 112 of the cam 105, the cam maintains the gate 90 in its extended position, and whenever the cam follower moves inwardly into engagement with the retracting zone 113 of the cam, the gate is permitted to drop by gravity into its retracted position. The operation of the cam 105 is so timed relative to the outlet section 52 of the conveyor 23 that the gate 90 is lowered into its retracted position at a frequency equal to the frequency of passage of the sweeping bars 54 on the outlet section 52.

As best shown in Figs. 1 and 2 of the drawing, the gate 90 is provided with a depending latch element 122 which is adapted to engage a substantially J-shaped, stationary latch element 123 carried by the frame 20 to prevent movement of the gate 90 into its retracted position when no pan strap is in engagement with the gate. The latch element 122 is biased toward a latched position wherein it engages the J-shaped latch element 123 and is aligned with a keeper element 124 defined by the lower end of the J-shaped latch element, the latch element 122 being so biased by means of springs 125 connected to the latch element 122 and to lugs on the arms 92. The gate 90 is rotatable about the points 93 of pivotal connection to the arms 92 under the influence of a pan strap in engagement therewith to move the latch element 122 from its latched position wherein it is aligned with the keeper element 124 to an unlatched position wherein it is misaligned with the keeper element 124 and is in engagement with a stop 126 carried by the frame 20. It will be noted that the stop 126 is spaced from the stationary keeper element 124 so that the movable latch element 122 carried by the gate may move downwardly between the keeper element 124 and the stop when a pan strap is in engagement with the gate.

Considering the operation of the conveyor system illustrated in Figs. 1 to 3 of the drawing, the inlet section 51 of the conveyor 23 delivers pan straps to the gate means 25 in sequence, the pan straps being located on the inlet section in more or less random fashion if desired. In other words, it is unnecessary for the pan straps on the inlet section to be spaced apart.

As each pan strap rides up onto the roller 95 carried by the gate 90 and encounters the gate, it is intercepted and restrained by the gate. If, when the pan strap is intercepted by the gate 90, the cam follower 118 is in engagement with the extending zone 112 of the cam 105, the force applied to the gate by the pan strap rotates the gate about its point of pivotal connection 93 to the arms 92 to move the depending latch element 122 from its latched position wherein it is in alignment with the keeper element 124 of the latch element 123 into its unlatched position wherein it engages the stop 126, the lower end of the latch element 122 being slightly above the keeper element 124 when the came follower 118 is in engagement with the extending zone 112 of the cam. The pan strap in engagement with the gate 90 rotates the gate to move the latch element into its unlatched position wherein it engages the stop 126 in opposition to the action of the springs 125, which exert a relatively small force on the gate. With the foregoing conditions obtaining, continued rotation of the cam 105 results in registration of the retracting zone 113 thereof with the cam follower 118, thereby permitting the cam follower to move inwardly into engagement with the retracting zone 113 so as to permit the gate 90 to move, under the influence of gravity, or other biasing means, into its retracted position, the latch element 122 being inserted between the latch element 123 and the stop 126 as the gate moves into its retracted position. Consequently, the pan strap in engagement with the gate rides over the idling roller 99 carried by the gate and rides downwardly on the idling rollers 100 onto the outlet section 52 of the conveyor 23. The pan strap deposited on the outlet section 52 in this manner is picked up by one of the sweeping bars 54 of the outlet section, such sweeping bars, as hereinbefore discussed, operating in timed relation with the gate.

It will be understood that the length of the retracting zone 113 of the cam 105 is such that the cam follower 118 re-engages the extending zone 112 of the cam to re-extend the gate 90 as, or preferably slightly before, the trailing end of the pan strap passed by the gate in the foregoing manner disengages the idling roller 99 carried by the gate. Thus, the gate is reextended to intercept the next pan strap in the series delivered to the gate means 25 by the inlet section 51 of the conveyor 23 even if it is not spaced from the preceding pan strap. The succeeding pan strap is then restrained by the gate 90 until such time as the cam 105 again rotates into a position wherein the retracting zone 113 thereof again registers with the cam follower 118, whereupon the preceding operating cycle is repeated.

As hereinbefore indicated, the foregoing mode of operation obtains only when each pan strap engages and is intercepted by the gate 90 with the cam follower 118 in engagement with the extending zone 112 of the cam so that the latch element 122 is held clear of the keeper element 124 of the latch element 123, a somewhat different mode of operation obtaining if a pan strap engages and is intercepted by the gate when the cam follower 118 is in registry with the retracting zone 113 of the cam 105. Considering the mode of operation under such conditions, if no pan strap is in engagement with the gate 90 at the beginning of the operating cycle of the cam 105, i. e., at the instant that the cam follower 118 disengages the extending zone 112 of the cam and registers with the retracting zone 113 thereof, the gate 90 is moved toward its retracted position by the biasing action of gravity. However, since no pan strap is in engagement with the gate, the springs 125 maintain the latch element 122 in its latched position wherein it is aligned with the keeper element 124 of the latch element 123 so that, after the gate moves toward its retracted position a slight distance, the latch element 122 engages the keeper element 124 to latch the gate in its extended position and to latch the latch element 122 in its latched position, as shown in Fig. 1 of the drawing. If, with such conditions obtaining, a pan strap engages and is intercepted by the gate 90, the gate will not move into its retracted position, even though the cam follower 118 is in registry with the retracting zone 113 of the cam 105. Thus, the latch elements 122 and 123 cooperate to retain the gate 90 in its extended position to prevent passage of the pan strap in engagement therewith until the beginning of the next operating cycle of the cam. Considering how this is accomplished, it will be apparent that, as the cam rotates to move the retracting zone 113 thereof out of registry with the cam follower 118, the extending zone 112 of the cam is rotated into engagement with the cam follower. Such re-engagement of the extending zone 112 of the cam with the cam follower 118 moves the gate 90 back into its fully extended position, thereby disengaging the latch element 122 from the keeper element 124. Consequently, the force exerted on the gate by the pan strap intercepted thereby now rotates the gate to move the latch element 122 into its unlatched position wherein it is no longer aligned with the keeper element 124. Subsequently, the extending zone 112 of the cam 105 disengages the cam follower 118 and the retracting zone 113 of the cam registers with the cam follower with the result that the pan strap now proceeds on its way along the outlet section 52 of the conveyor 23 in the same manner as hereinbefore described.

Thus, the gate 90 passes a pan strap only at the beginning of each operating cycle of the cam 105, i. e., only when the extending zone 112 of the cam disengages the cam follower 118 to bring the retracting zone 113 thereof into registry with the cam follower. This insures that the pan straps are always discharged onto the outlet section 52 of the loading conveyor in perfect synchronism with the passage of the sweeping bars 54 of the outlet section. Thus, the gate means 25 synchronizes the flow of pan straps through the conveyor system with the operation of the various elements of the conveyor system, which is an important feature of the invention.

Referring now to Figs. 4 and 5 of the drawing, illustrated therein is a conveyor system which is similar to that described previously and which includes a frame 220 carrying a conveyor 223 and carrying an escapement or gate means 225 corresponding to the gate means 25. The conveyor 223 is divided into inlet and outlet sections 251 and 252 which are substantially identical to the inlet and outlet sections 51 and 52, respectively, so that a detailed description thereof is unnecessary. The outlet section 252 of the conveyor 223 is driven by a sprocket 269 which is driven in any suitable manner, not shown. The inlet section 251 may be driven as discussed in connection with the inlet section 51.

The gate means 225 is substantially identical to the gate means 25 and includes a gate 290 which differs from the gate 90 only in the omission of the roller 95 and the drive therefor. The gate 290 is supported pivotally at 293 by an arm means 291 which includes a pair of transversely spaced, substantially parallel arms 292. The gate means 225 includes a cam 305 which is identical to the cam 105 and which is driven by a sprocket 307, the latter, in turn, being driven, through a chain 308, in timed relation with the outlet section 252, as indicated by the broken-line connection 309. The gate means 225 includes a cam follower 318 which, instead of being mounted on a separate arm of the arm means 291 as in the case of the cam follower 118, is mounted on one of the arms 292. The gate means 225 includes latch elements 322 and 323 which correspond to the latch elements 122 and 123, respectively, and includes elements 324, 325 and 326 associated with the latch elements 322 and 323 which are identical to the elements 124, 125 and 126 and associated with the latch elements 122 and 123. The operation of the gate means 225 is identical to that of the gate means 25 and will not be described in detail.

While I have disclosed exemplary embodiments of my invention herein for purposes of illustration, it will be understood that various changes, modifications and substitutions may be incorporated therein without departing from the spirit of the invention.

I claim as my invention:

1. In a conveyor system, the combination of: a conveyor; a gate movable relative to said conveyor between an extended position wherein it extends into the path of an article on said conveyor to intercept such article and a retracted position wherein it is withdrawn from said path, said gate being biased toward said retracted position; actuating means for said gate including a cam rotatable successively through operative and inoperative positions and including cam follower means connected to said gate and adapted to engage said cam, said actuating means moving said gate from said retracted position to said extended position as said cam rotates from said inoperative position to said operative position, and permitting movement of said gate from said extended position to said retracted position as said cam rotates from said operative position to said inoperative position; latch means including a stationary latch element and a latch element connected to said gate for preventing movement of said gate from said extended position to said retracted position if no article on said conveyor is intercepted by said gate upon rotation of said cam from its operative position into its inoperative position; and a stationary keeper member carried by said stationary latch element for locking said latch elements in latched relation when said gate is engaged by an article during said inoperative position of said cam, whereby to prevent retraction of said gate.

2. A conveyor system according to claim 1 wherein said gate is pivotally connected to said cam follower means for pivotal movement from a position wherein the latch element connected to said gate is aligned with said stationary latch element to a position wherein the latch elements are misaligned, said gate being biased toward said position wherein said latch elements are aligned and being pivotable into said position wherein said latch elements are misaligned by an intercepted article on said conveyor.

3. In a conveyor system, the combination of: a frame; a conveyor carried by said frame; arm means pivotally connected to said frame; a gate carried by said arm means, said arm means being pivotable relative to said frame to move said gate relative to said conveyor between an extended position wherein said gate extends into the path of an article on said conveyor to intercept such article and a retracted position wherein said gate is withdrawn from said path, said gate being pivotally connected to said arm means for movement between a latched position and an unlatched position, said gate being biased toward said retracted position and being biased toward said latched position, and being adapted to be moved into said unlatched position by an intercepted article on said conveyor; a rotatable cam carried by said frame and providing a continuous cam surface which includes extending and retracting zones; a cam follower carried by said arm means between the pivotal mounting of said arm means on said frame and the pivotal mounting of the gate on said arm means and engageable with said extending and retracting zones of said cam surface, said cam acting through said cam follower and said arm means to move said gate from its retracted position into its extended position when said cam follower is in engagement with said extending zone of said cam surface, and said cam permitting movement of said gate from said extended position to said retracted position when said cam follower disengages said extending zone of said cam surface; a stationary latch element carried by said frame; a movable latch element connected to said gate and movable between positions wherein it is aligned with and misaligned with said stationary latch element in response to movement of said gate between said latched and unlatched positions, respectively, said movable latch element being adapted to engage said stationary latch element when said gate is in said latched position to prevent movement of said gate from said extended position to said retracted position; and means for operating said cam and said conveyor in timed relation.

4. A conveyor system according to claim 3 including a stop carried by said frame and engageable by said movable latch element for preventing pivotal movement of said gate beyond said unlatched position under the influence of an intercepted article on said conveyor.

5. In a conveyor system, the combination of: a frame; conveyor means carried by said frame and movable relative thereto; a gate support carried by said frame and movable relative thereto; a gate carried by said gate support and movable relative thereto, movement of said gate support producing movement of said gate relative to said conveyor means between an extended position wherein said gate is disposed in the path of an article on said conveyor means and a retracted position wherein it is spaced from said path; actuating means operatively engaging said gate support for moving said gate between said extended and retracted positions; and latch means for latching said gate in said extended position, said latch means being releasable in response to movement of said gate relative to said gate support by the pressure of an article on said conveyor means against the gate.

6. In a conveyor system, the combination of: a frame; conveyor means carried by said frame and movable relative thereto; a gate support carried by said frame and movable relative thereto; a gate carried by said gate support and movable relative to said conveyor means between an extended position wherein said gate is disposed in the path of an article on said conveyor means and a retracted position wherein it is spaced from said path in response to movement of said gate support relative to said frame, said gate being pivotally mounted on said gate support and being movable relative thereto by the pressure of an article on said conveyor means against said gate; actuating means operatively engaging said gate support for moving said gate support so as to move said gate between said extended and retracted positions; and latch means, including a depending latch element carried by said gate for pivotal movement in a direction opposed to the movement of said gate and a latch element carried by said frame, for latching said gate in said extended position, movement of said gate relative to said gate support by an article on said conveyor means producing movement of said latch element carried by said gate out of engagement with said latch element carried by said frame.

7. A conveyor system according to claim 6 wherein said actuating means includes cam means engageable with said gate support.

8. In a conveyor system, the combination of: a conveyor; a gate movable relative to said conveyor between an extended position wherein it extends into the path of an article on said conveyor to intercept such article and a retracted position wherein it is withdrawn from said path, said gate being pivotally mounted for movement between a latched and an unlatched position; said gate being biased toward said retracted position and being biased toward said latched position, and being adapted to be moved into said unlatched position by an intercepted article on said conveyor; actuating means for said gate alternately operative to move said gate to extended position and to permit biasing retraction of said gate; a stationary latch element; a movable latch element carried by said gate and movable between positions wherein it is aligned with and misaligned with said stationary latch element in response to movement of said gate between said latched and unlatched positions, respectively, said movable latch element being adapted to engage said stationary latch element when said gate is in said latched position to prevent movement of said gate from said extended position to said retracted position, and a stationary locking member carried by said stationary latch element for locking said latch elements in latched relation when said gate is engaged by an article and when said gate actuating means is inoperative to extend said gate whereby to prevent retraction of said gate by said biasing means; said gate actuating means being adapted when operative to extend said gate, to disengage said movable latch member from said stationary locking member whereby said gate member is movable to unlatched position by an intercepted article on said conveyor.

9. A conveyor system according to claim 8, wherein said actuating means includes a pair of coaxially mounted cam members rotatably adjustable with respect to each other in any one of a number of predetermined positions, for varying the relative extended and retracted periods of said gate.

References Cited in the file of this patent

UNITED STATES PATENTS

| Number | Name | Date |
|---|---|---|
| 1,557,350 | Stebler | Oct. 13, 1925 |
| 1,588,821 | Stebler et al. | June 15, 1926 |
| 1,980,411 | Kimball et al. | Nov. 13, 1934 |
| 2,576,369 | Sticelber | Nov. 27, 1951 |